C. W. Sherwood,
School Desk and Seat,
No. 2,865. Reissued Feb. 11, 1868.
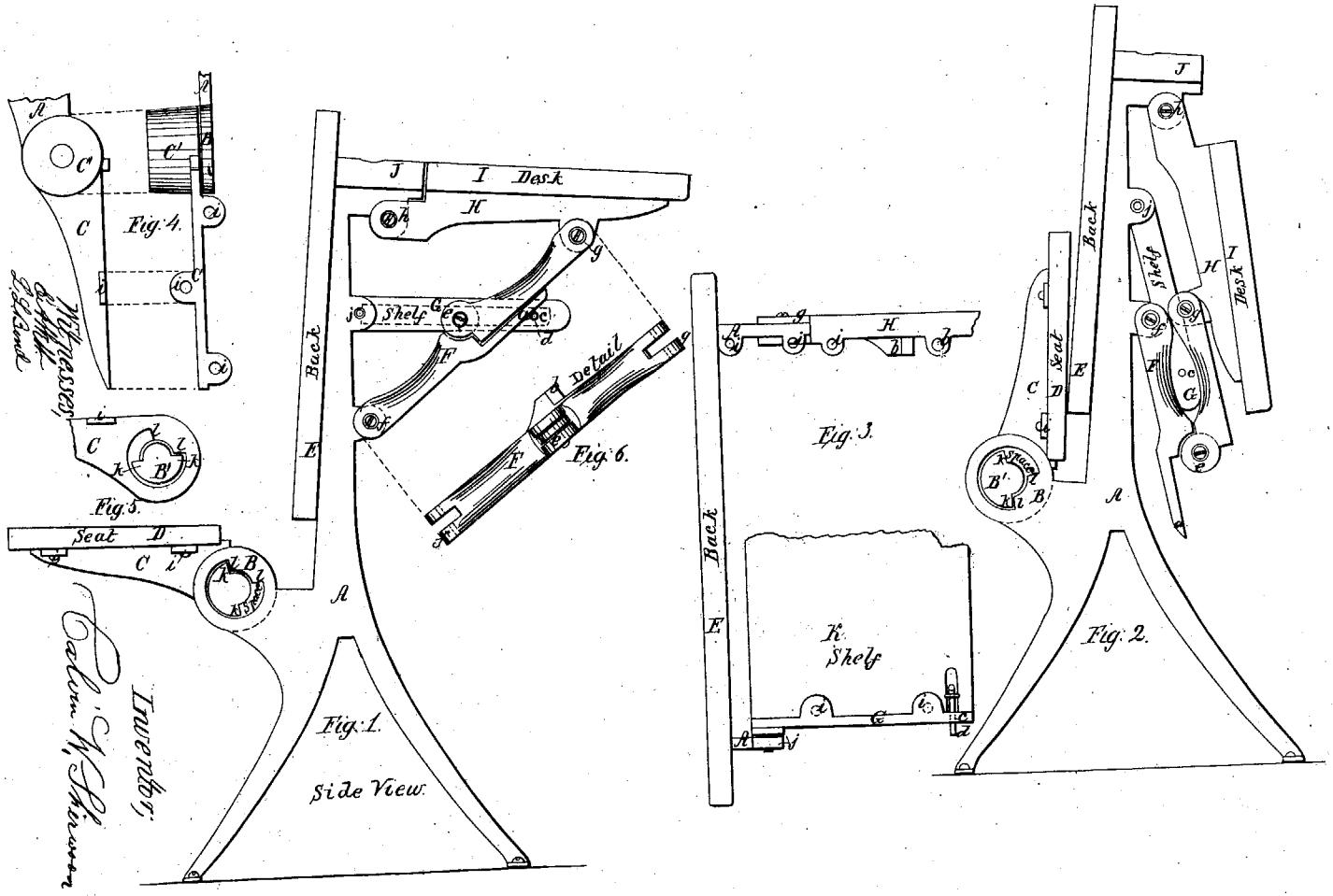
N. PETERS, PHOTO-LITHOGRAPHER, WASHINGTON, D. C.

UNITED STATES PATENT OFFICE.

CALVIN W. SHERWOOD, OF CHICAGO, ILLINOIS.

IMPROVED SCHOOL-DESK AND SEAT.

Specification forming part of Letters Patent No. 59,566, dated November 6, 1866; reissue No. 2,865, dated February 11, 1868.

DIVISION A.

*To all whom it may concern:*

Be it known that I, CALVIN W. SHERWOOD, of the city of Chicago, in the county of Cook and State of Illinois, have invented certain new and useful Improvements in School Desks and Seats; and I do hereby declare that the following is a full, clear, and exact description thereof, reference being had to the accompanying drawings, making a part of this specification, in which—

Figure 1 is an end view of the desk and seat; Fig. 2, a similar view with the seat turned up. Fig. 3 is not essential to this specification. Fig. 4 is a top and inside view of the seat-arm; Fig. 5, an outside view of a portion of the seat-arm with axle inserted.

My invention does not go to the extent of claiming a folding seat, broadly, such seats having been made heretofore, but consists in providing the joint with a double-acting stop to support the seat in its place, whether up or down, and in so constructing the joint that it is covered.

To enable others skilled in the art to make and use my folding seat, I proceed to describe its construction and operation.

The standards A are made of cast-iron and sufficiently long to bring the desk and other parts to the required height.

On the side to which the seat is attached a projection is cast with a circular head, B, at such point as will bring the seat at a proper distance from the floor. On the inside of this projection an axle, B′, is cast, which projects at right angles with the surface of the head B any required distance, usually about one inch. This axle, as shown, is made upon two circles having a common center, the circle of one-half having a radius of about one-half of one inch, and that of the other half having a radius of about three-fourths of one inch, as shown in Fig. 5 and by red lines in Figs. 1 and 2.

The seat-arms C are provided with naves, C′, fitting upon the axles B′. These naves are also made internally on two circles. Three-fourths of the distance around the circle is the same as the larger circle of the axles, and one-fourth is the same in size as the smaller one, so that when the naves are fitted onto the axles they will turn only one-fourth the distance around them.

The several parts of the joint are so constructed that shoulders *k* and *l* are produced, which operate as a double-acting stop and hold the seat in place, whether up or down, and prevent the seat when turned up from hitting the back, thus avoiding noise and preserving the back from being marred. I also bring all parts of the joint within a small compass, and make a covered joint, both strong and compact, in which clothing cannot be caught and the operation of which cannot be interfered with. I am able to make the covered joint by locating the stop, as well as the other parts of the joint, on the head B.

To avoid noise, I attach strips of rubber or leather to the shoulders or stops *k k* of the the axle, and if it is desired to make the seat stationary, a quadrant or wedge may be placed in the space.

When the arms are attached to the seat they cannot get out of place.

Having thus described my invention, what I claim as new, and desire to secure by Letters Patent, is—

1. The joint composed of the nave C′ and axle B′, constructed and operating substantially as set forth.
2. The arrangement and combination of the arms C, nave C′, and axle B′, with the seat D and standard A, substantially as specified.
3. The double-acting stop *k*, constructed and operating substantially as specified.
4. So locating and arranging the stop *k* and axle B′ on the head B that with the nave C′ a covered and compact joint is provided, substantially as and for the purposes specified.
5. The double-acting stop *k*, in combination with the shoulder *l*, operating in the slot or space, substantially as specified.

C. W. SHERWOOD.

Witnesses:
E. A. WEST,
E. B. SHERMAN.